Jan. 10, 1967     G. F. ZIEGLER     3,297,393
OIL IMMERSION TYPE MICROSCOPE OBJECTIVE
Filed Sept. 30, 1963
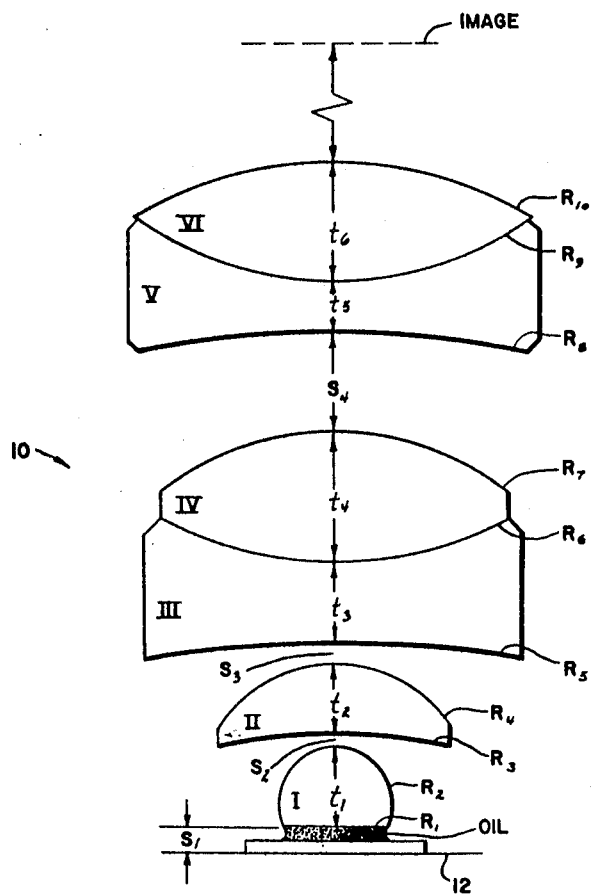
GEORGE F. ZIEGLER
INVENTOR.
BY Frank C. Parker
ATTORNEY

United States Patent Office 3,297,393
Patented Jan. 10, 1967

3,297,393
OIL IMMERSION TYPE MICROSCOPE OBJECTIVE
George F. Ziegler, Gates, N.Y., assignor to Bausch & Lomb Incorporated, Rochester, N.Y., a corporation of New York
Filed Sept. 30, 1963, Ser. No. 312,626
2 Claims. (Cl. 350—179)

The present invention relates to a microscope objective; more particularly it relates to improvements in an achromatic oil immersion type of objective.

Microscope objectives of the oil immersion type are generally of high magnification such as 90X and high numerical apertures such as 1.30. It is an object of the present invention to provide such an objective which is well corrected for the usual image aberrations, such as chromatic and spherical aberration, coma and astigmatism.

It is a further object to provide such a device which provides an unusually large oil space between the objective and the cover glass for safety of operation of the objective during focusing operations.

Further advantages of the invention will be apparent from a study of the specification below in connection with the drawing, wherein the single figure is an optical diagram of a preferred form of the said invention.

In the drawing, said objective is generally designated by the numeral 10. The objective is designed to perform in a superior manner particularly as regards chromatic and spherical aberration in addition to good astigmatic and comatic conditions.

Comprised in said objective 10 are four optically aligned lens members which are spaced from each other and are spaced away from an object plane 12. The objective 10 forms an image of a specimen at an eyepiece focal plane which is located at an axial distance of substantially 236.7 mm. rearwardly of the object plane.

The foremost lens member is a singlet lens designated I having a plano convex form and spaced rearwardly therefrom is a positive meniscus singlet lens designated II. Spaced rearwardly from lens II is a pair of spaced doublets of positive meniscus form which are designated (III, IV) and (V, VI), the front lens element of each doublet being double concave in form and designated III and V numbering from the front, and the rear elements of the doublets being double convex in form and being designated IV and VI.

With respect to the lens parameters, the axial thicknesses of the successive lens elements I to VI are designated $t_1$ to $t_6$, and the successive axial spaces from the object plane 12 rearwardly are designated $S_1$ to $S_4$, the front space $S_1$ being abnormally large for an oil immersion objective and it is provided for the accommodation of a cover glass and a large volume of oil whereby freedom of focusing movement of the objective is increased by a factor of about 2 which results in greater safety of operation.

Specifically, the values of the optical parameters for one successful form of this invention are given in the table of mathematical statements herebelow wherein the designations for the successive lens radii are $R_1$ to $R_{10}$ and the minus (—) sign used therewith applies to those surfaces whose centers of curvature lie on the entrant side of their vertices, $t_1$ to $t_6$ represent the successive axial lens thicknesses, $S_1$ to $S_4$ represent the successive axial spaces, and $n_D$ and $\nu$ represent respectively the refractive index and Abbe number of the glasses in the successive lenses.

| | |
|---|---|
| $R_1$=Plano | $S_1$=.161$F$ |
| $-R_2$=.406$F$ | $S_2$=.01074$F$ |
| $-R_3$=4.060$F$ | $S_3$=.0307$F$ |
| $-R_4$=1.00$F$ | $S_4$=.531$F$ |
| $-R_5$=18.17$F$ | $n_D$(I)=1.523 |
| $R_6$=2.754$F$ | $n_D$(II)=1.511 |
| $-R_7$=2.053$F$ | $n_D$(III)=1.649 |
| $-R_8$=47.20$F$ | $n_D$(IV)=1.513 |
| $R_9$=2.565$F$ | $n_D$(V)=1.720 |
| $-R_{10}$=3.257$F$ | $n_D$(VI)=1.511 |
| $t_1$=.473$F$ | $\nu$(I)=58.6 |
| $t_2$=.512$F$ | $\nu$(II)=63.5 |
| $t_3$=.611$F$ | $\nu$(III)=33.8 |
| $t_4$=.914$F$ | $\nu$(IV)=60.5 |
| $t_5$=.508$F$ | $\nu$(V)=29.3 |
| $t_6$=.817$F$ | $\nu$(VI)=63.5 | the $n_D$ and $\nu$ values being absolute values.

Numerically stated, the constructional data for said successful form of the invention is given in the chart of values herebelow wherein the designations remain the same as heretofore.

[E.F.L.=2.6 mm.   Magnification=90X   N.A.=1.30]

| Lens | Radii | Thicknesses | Spaces | $n_D$ | $\nu$ |
|---|---|---|---|---|---|
| I | $R_1$ =Plano | $t_1$=1.23 | $S_1$=.42 | 1.523 | 58.6 |
| | $-R_2$=1.0568 | | | | |
| II | $-R_3$=10.568 | $t_2$=1.33 | $S_2$=.028 | 1.511 | 63.5 |
| | $-R_4$=2.6062 | | | | |
| III | $-R_5$=47.863 | $t_3$=1.59 | $S_3$=0.080 | 1.649 | 33.8 |
| | $R_6$=7.178 | | | | |
| IV | $-R_7$=5.3456 | $t_4$=2.38 | | 1.513 | 60.5 |
| | $-R_8$=122.46 | | $S_4$=1.38 | | |
| V | $R_9$=6.6681 | $t_5$=1.32 | | 1.720 | 29.3 |
| VI | $-R_{10}$=8.4723 | $t_6$=2.13 | | 1.511 | 63.5 |

Although only a preferred form of the present invention has been shown and described in detail, other forms are possible and changes may be made in the values of the optical parameters within the limits stated without departing from the spirit of the invention as defined in the claims recited herebelow.

I claim:

1. A high power microscope objective of the oil immersion type having a numerical aperture of substantially 1.30, said objective comprising a succession of four optically aligned lens members, the two foremost being singlet lenses designated I and II, and the two rearmost lens members being doublets in which each is composed of a front double concave lens element in contact with a rear double convex lens element, said elements being successively numbered III to VI, the specific constructional data for said objective being given in the table of mathematical statements herebelow wherein F designates the equivalent focal length of said objective, $R_1$ to $R_{10}$ designate the radii of the successive lens surfaces numbering from the front of the objective, the minus (—) sign used therewith being applied to those surfaces whose centers of curvature lie on the entrant side of their vertices, $t_1$ to $t_6$ represent the axial thicknesses of the successive lens elements, $S_1$ to $S_4$ represent the successive axial air spaces rearwardly of the object plane, except that $S_1$ is occupied by cover glass and oil and $n_D$ and $\nu$ represent respectively the refractive index and Abbe number of the optical materials whereof the elements are formed,

| | |
|---|---|
| $R_1$ = Plano | $S_1$ = .161F |
| $-R_2$ = .406F | $S_2$ = .01074F |
| $-R_3$ = 4.060F | $S_3$ = .0307F |
| $-R_4$ = 1.00F | $S_4$ = .531F |
| $-R_5$ = 18.17F | $n_D(I)$ = 1.523 |
| $t_1$ = .473F | $n_D(II)$ = 1.511 |
| $t_2$ = .512F | $n_D(III)$ = 1.649 |
| $t_3$ = .611F | $n_D(IV)$ = 1.513 |
| $t_4$ = .914F | $n_D(V)$ = 1.720 |
| $t_5$ = .508F | $n_D(VI)$ = 1.511 |
| $t_6$ = .817F | $\nu(I)$ = 58.6 |
| $R_6$ = 2.754F | $\nu(II)$ = 63.5 |
| $-R_7$ = 2.053F | $\nu(III)$ = 33.8 |
| $-R_8$ = 47.20F | $\nu(IV)$ = 60.5 |
| $R_9$ = 2.565F | $\nu(V)$ = 29.3 |
| $-R_{10}$ = 3.257F | $\nu(VI)$ = 63.5 | the $n_D$ and $\nu$ values being absolute values.

2. A high power microscope objective of the oil immersion type, said objective comprising a succession of four optically aligned lens members, the two foremost being singlet lenses designated I and II, and the two rearmost lens members being doublets, each being composed of a front double concave element in contact with a rear double convex element, said elements being successively numbered III to VI, the specific numerical constructional data for said objective being given in the chart of values herebelow wherein E.F.L. designates the equivalent focal length and N.A. designates the numerical aperture of the objective, $R_1$ to $R_{10}$ represent the radii of the successive lens surfaces numbering from the front of the objective, and the minus (—) sign used therewith applies to those surfaces whose centers of curvature lie on the entrant side of their vertices, $t_1$ to $t_6$ represent the axial thicknesses of the successive lens elements, $S_1$ to $S_4$ represent the successive axial air spaces rearwardly of the object plane except that $S_1$ is occupied by cover glass and oil and $n_D$ and $\nu$ represent respectively the refractive index and Abbe number of the lens materials,

[E.F.L. = 2.6 mm.  Magnification = 90X  N.A. = 1.30]

| Lens | Radii | Thicknesses | Spaces | $n_D$ | $\nu$ |
|---|---|---|---|---|---|
| I | $R_1$ = Plano | $t_1$ = 1.23 | $S_1$ = .42 | 1.523 | 58.6 |
| | $-R_2$ = 1.0568 | | | | |
| II | $-R_3$ = 10.538 | $t_2$ = 1.33 | $S_2$ = .028 | 1.511 | 63.5 |
| | $-R_4$ = 2.6062 | | | | |
| III | $-R_5$ = 47.863 | $t_3$ = 1.59 | $S_3$ = .080 | 1.649 | 33.8 |
| IV | $R_6$ = 7.178 | $t_4$ = 2.38 | | 1.513 | 60.5 |
| | $-R_7$ = 5.3456 | | | | |
| V | $-R_8$ = 122.46 | $t_5$ = 1.32 | $S_4$ = 1.38 | 1.720 | 29.3 |
| VI | $R_9$ = 6.6681 | $t_6$ = 2.13 | | 1.511 | 63.5 |
| | $-R_{10}$ = 8.4723 | | | | |

No references cited.

JEWELL H. PEDERSEN, *Primary Examiner.*

J. K. CORBIN, *Assistant Examiner.*